(No Model.) 5 Sheets—Sheet 3.
W. F. GAUL.
BALLOT BOX.
No. 455,685. Patented July 7, 1891.
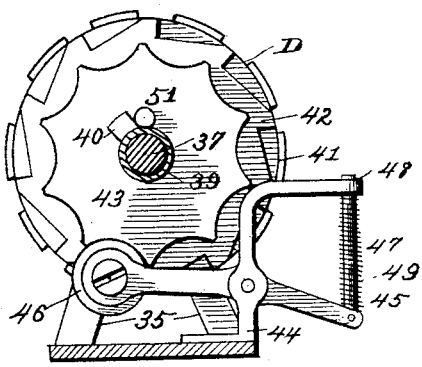
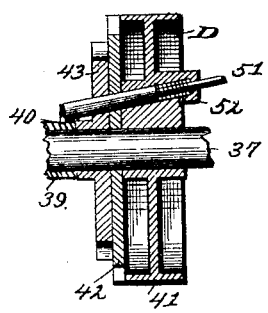
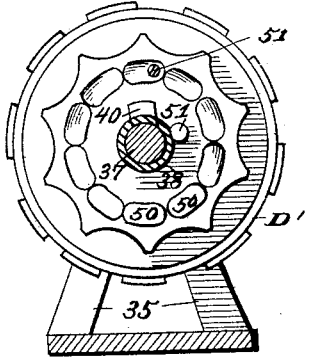
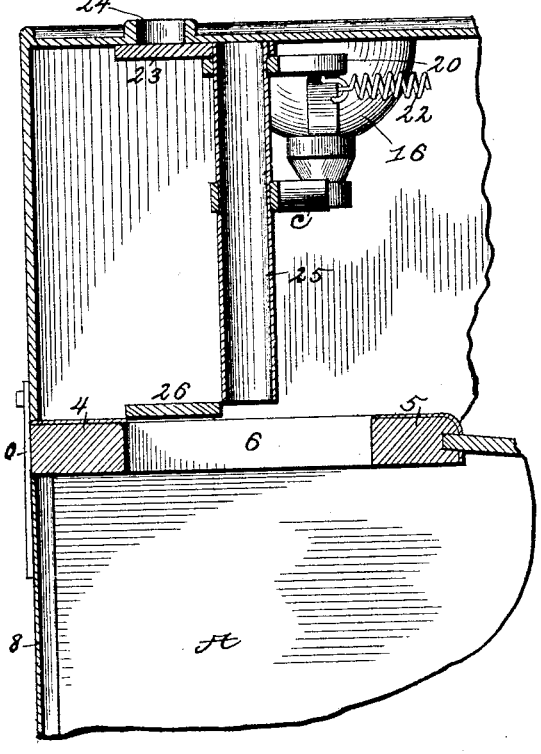
Witnesses
G. A. Vanderschmidt,
B. W. Sommers.
Inventor
William F. Gaul,
By his Attorney
A. G. Heylmun (No Model.) 5 Sheets—Sheet 4.
W. F. GAUL.
BALLOT BOX.

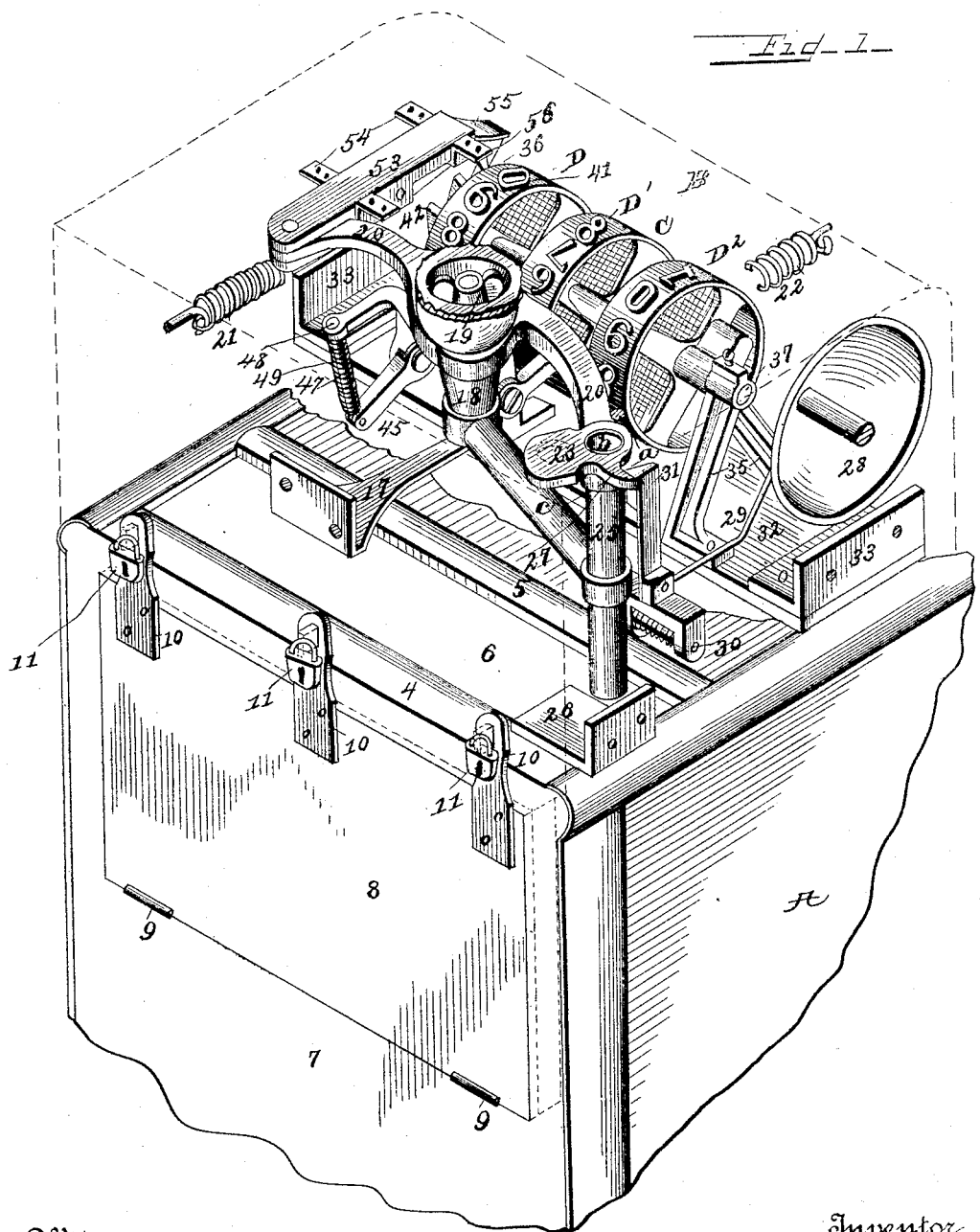

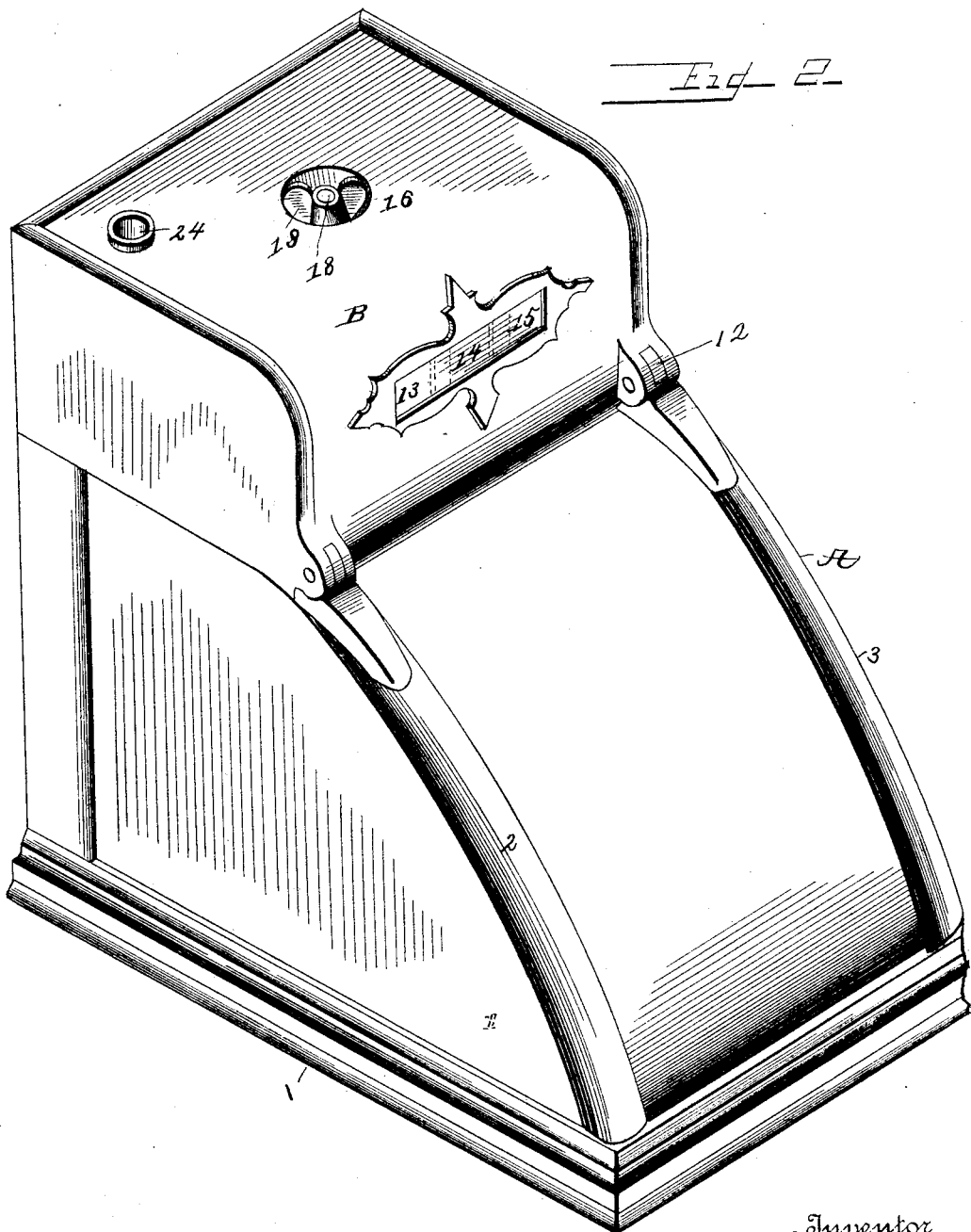

No. 455,685. Patented July 7, 1891.

Witnesses
G. A. Tauberschmidt.
B. W. Sommers.

Inventor
William F. Gaul.
By his Attorney,
A. G. Heylmun

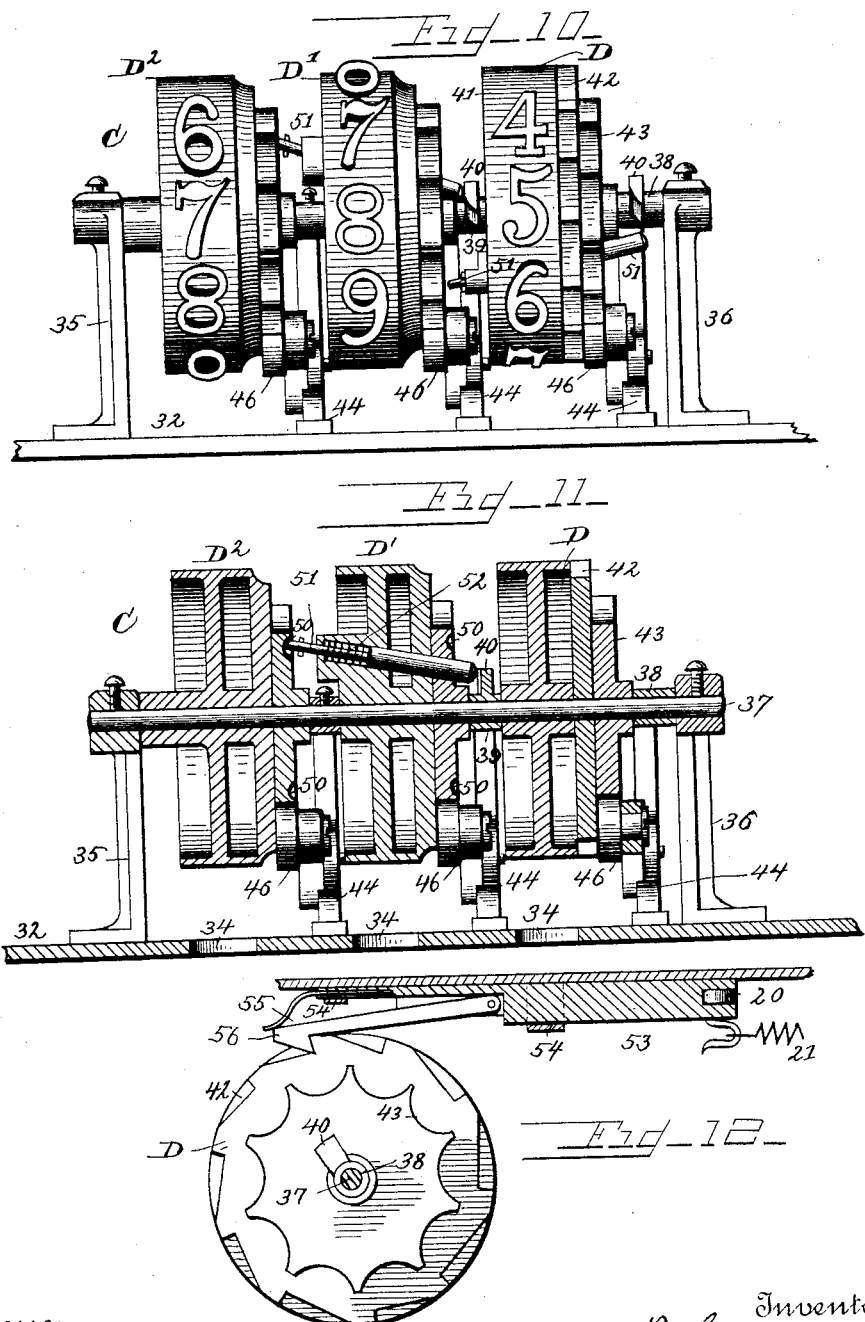

UNITED STATES PATENT OFFICE.

WILLIAM F. GAUL, OF MYERSDALE, PENNSYLVANIA, ASSIGNOR OF ONE-HALF TO LOUIS T. DEROUSSE, OF CAMDEN, NEW JERSEY.

BALLOT-BOX.

SPECIFICATION forming part of Letters Patent No. 455,685, dated July 7, 1891.

Application filed December 23, 1889. Renewed April 14, 1891. Serial No. 388,896. (No model.)

*To all whom it may concern:*

Be it known that I, WILLIAM F. GAUL, a citizen of the United States of America, residing at Myersdale, in the county of Somerset and State of Pennsylvania, have invented a new and useful Ballot-Box, of which the following is a specification.

My invention has relation to improvements in ballot-boxes; and the object is to provide a ballot-box of simple construction which can be conveniently manipulated and having reliable registering mechanism associated with a ballot-depositing mechanism, whereby the probability of fraud being transacted in the deposition of the ballot is at the lowest possibility.

I accomplish the purposes of my invention by means of the mechanism illustrated in the accompanying drawings, wherein—

Figure 8:
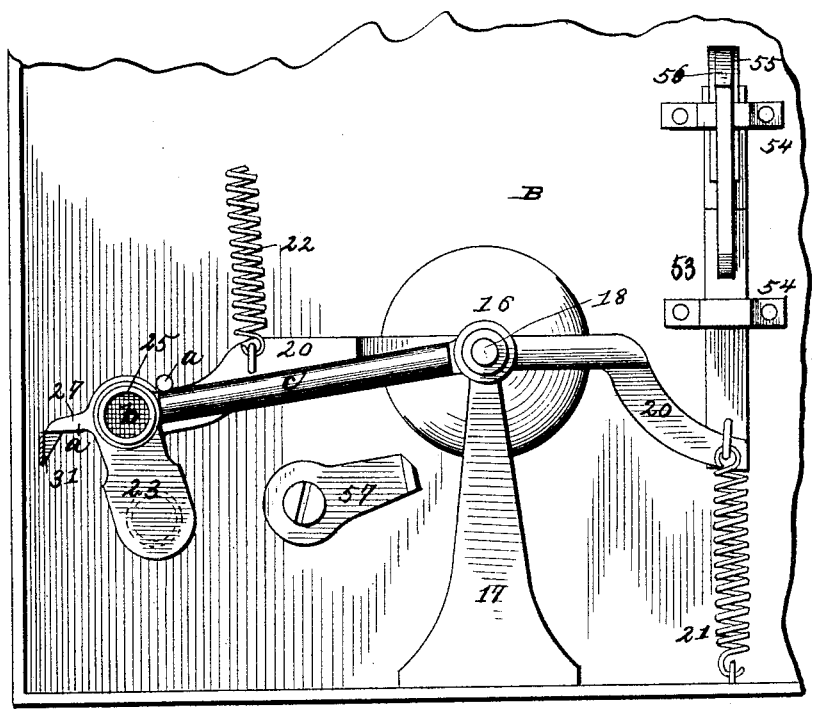
Figure 9:
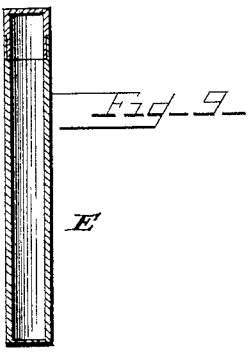

Figure 1 is a perspective of the ballot-box, the metal casing being indicated in dotted lines to show the interior mechanism. Fig. 2 is a view of the ballot-box with the metal casing in position. Fig. 3 is a side view of the primary registering-wheel with the spring-arm engaging the wave-wheel. Fig. 4 is a sectional view of the primary registering-wheel, taken on a line through the way holding the spring plunger or bar. Fig. 5 is a side view of one of the registering-wheels employed in the series occurring after the primary registering-wheel. Fig. 6 is a detail of the actuating-lever and sectional view of the ballot-tube, taken centrally through the tube and longitudinally through the plate or tongue which closes the ballot-aperture in the metal case. Fig. 7 is a detail view of the alarm and tappet mechanism. Fig. 8 is a reverse plan view of the lever mechanism in the top of the metal casing. Fig. 9 is a vertical central section of a ballot-tube applicable for use in my improved ballot-box. Fig. 10 is a front view in elevation of the registering mechanism. Fig. 11 is a longitudinal and vertical central section of the registering mechanism, showing one of the spring-plunger bars. Fig. 12 is a detail side view of the wave-wheel and ratchet with its actuating pawl.

A designates the ballot-box case, wherein the ballots are deposited from the upper metal case. This depository is composed of a substantial bottom piece 1, constituting the floor of the case and having arranged therein the arched side frames 2 3, constructed to receive and securely retain glass plates. Between the side frames is also secured an arched front and top of glass. The construction shown is that considered convenient and reliable; but this portion of the ballot-box may be of any suitable design or construction to receive the ballots and adapted to properly support the glass casing and the metal case or box within which the mechanism is arranged. At the upper rear end of the casing the side pieces of the box-frame are connected by a substantial cross-piece 4, and arranged at the proper distance therefrom, toward the front of the box, is an intermediate cross-piece 5. The space 6 between the cross-pieces is left open for the ballots to drop through from the upper metal case into the depository below. At the rear end of the depository-case is an end piece 7, extending only partially upward over the end of the case, substantially as shown, and to the upper edge of this end piece is hinged the door 8, closing the remaining opening in the end of the depository. The hinges 9 of the door are arranged on the inner side of the depository, so that the opportunity for removal may be lessened. On the upper edge of the door are hasps 10, which set over staples or eyes in the lower edge of the upper or metal case. Locks 11 are used to connect the hasps and staples and lock the parts together. I have shown three locks connected to the box, the purpose being to have a different lock to each connection and a single key in the custody of different officers, so that there must be unity of design and intent before the box can be opened and the contents examined.

B designates the upper or metal case, consisting of a substantial metal casing hinged at its lower front parts or corners to lugs 12 on the arched side pieces of the depository. In the front of the casing B are apertures 13 14 15 for displaying the figures or characters on the registering-wheels. A glass plate is used to close the apertures. In the top of the metal case is formed a recess 16, which receives the finger-piece 19, by which the mechanism is operated. On the metal case is secured a bracket 17, having a bearing in its end, in which the end of a fulcrum-shaft 18 is journaled, the upper portion of the shaft being supported in a bearing in the middle of the recessed part of the casing, and on the projecting end of the shaft 18 is fixed a finger-piece 19, by which the shaft may be turned in its bearings. On the shaft 18 is rigidly fixed a lever 20, which has its arms bent in the region of the shell of the recess to conform to the contour thereof, and thus permit the outer portion of the arms to sweep the plane of the inner face of the metal case. To the one arm of the lever (shown herein to be the shorter) is connected a retractible spring 21, having its other end fastened to a stud or hook fixed in the casing. At the end of the other or longer arm of the lever 20 is secured one end of a spring 22, the force of which is exerted in the direction opposite to the force of the spring 21 at the other end, so that the lever will be returned to its normal position by the united pull of the springs. One spring may be sufficient to effectuate the purpose; but for security in case one should be broken two are represented. To limit the sweep of the lever in its return movement, a stud $a$ is fixed in the casing, against which it lodges and rests when in its normal position. On the end of the lever 20 is formed a plate or tongue 23, extended in a proper direction to slide over and shut the ballot-aperture 24 in the top of the case. The rear end or portion of this plate or tongue is formed with an aperture $b$, and from the tongue in line of this ballot-aperture is arranged and secured a tube 25. In normal position of the lever the plate 23 stands across the ballot-aperture in the case, so that no ballot can be admitted until the tongue is moved out of the way and the open end of the tube is presented in registration with the ballot-aperture. The tube is braced by an arm $c$, extending from the shaft to the tube, as shown. At the lower side of the casing is a bracket 26, the foot or plate of which stands directly under the ballot-aperture and directly under the lower end of the tube 25 when arranged to receive a ballot and prevents the insertion in the tube of more than one ballot-tube at a time. On the end of a lever 20 is a cam-lug 27, which engages a reversely-arranged lug on the arm 31 of the bell-tappet. A signal-bell 28 is supported in the case and the alarm given by a spring-actuated tappet 29, having a bearing 30, with torsional spring to return the stroke, and a spring-arm 31, carrying a lug on its upper end to be engaged by the lug 27 on the end of the lever.

The mechanism specified in the foregoing description, independent of the alarm, is all that is absolutely essential to effectuate the deposition of the ballot and might be employed separate from the rest of the associated mechanism; but, since the object of my invention is to provide a complete apparatus or machine for the purpose, I have associated a registering mechanism therewith, and also the signal. The registering mechanism I now proceed to describe.

C designates the registering mechanism, generally supported on a plate 32, fixed to brackets 33, secured to the sides of the metal casing. In the plate 32 are apertures 34, which register with the numbers on the wheels, so that a party can observe the relation of the numerals on the wheels through these apertures when setting the wheels with the case thrown back on its hinges. To the plate 32 are secured standards 35 36, having bearings in which a shaft 37 is fixed. On the shaft are fixed sleeves 38 39, on which are formed cam-lugs 40, engaged by the ends of the spring-plunger bars 51 in the registering-wheels.

D designates the primary registering-wheel mounted loosely on the fixed shaft. This wheel consists of a flange part 41, having numerals thereon from 0 to 9, a ratchet 42 on the side of the wheel to be engaged by a pawl 53, hereinafter described, and a wave-wheel 43 on the side of the ratchet-wheel. On the plate 32 are secured supports 44, to which are fulcrumed spring-actuated arms 45, carrying rollers 46 on their inner ends, which engage the recesses of the wave-wheels and hold them in the positions to which they are intermittently moved by the pawl and ratchet. On the ends of the arms 45 are jointed rods 47, arranged with their upper ends in holes 48 in the ends of the supports 44, and about these rods 47 are arranged springs 49, the force of which throws the rollers of the levers into the recesses of the wave-wheel.

D' D² designate the additional registering-wheels, which are substantially of the same construction as the primary registering-wheel D, excepting that the ratchet element is dispensed with between the wave-wheel and the number-bearing part and differing therefrom in having gradually-deepening and abruptly-terminating recesses 50 to be engaged by spring-actuated plunger-bars 51, arranged in ways 52, made in the registering-wheel. These plunger-bars are pushed forward by contact of their ends with the cam-lugs on the fixed shaft into the recesses 50 in the side faces of the wheels, and thus turn the registering-wheels by such engagement.

In the casing is arranged a pawl or latch-bar 53, sliding in keepers 54 and carrying on its free end a spring 55. To this latch-bar is jointed a pawl 56, the end of which engages the notches on the primary registering-wheel and turns that the distance of one number when the lever is released by the operator, the spring keeping the pawl in position to engage the ratchets. In the casing is pivoted a locking-lug 57, which may be turned with its end to bear on the side of the lever and hold it in locked condition against the lug or pin $a$.

E designates the ballot-tube, which consists of a tube within which is concealed a ballot.

This tube is made of such diameter and length as to fit loosely in the tube through which it reaches the depository.

The operation of the machine is as follows: The ballot-tube, being supplied with the ballot or ballots is handed to the officer in charge of the ballot-box and by him placed endwise in the ballot-aperture in the top of the box. At the same time the finger-piece is grasped and turned in the direction to move the lever which carries the plate or tongue from over the aperture and brings the tube in alignment with the aperture, when the ballot-tube can be dropped down into the tube, where it is retained by lodging on the bracket, now under the end of the tube. When the finger-piece is released, the tube moves with the lever, so that the end is free from the bracket and the ballot-tube drops down into the depository below. When the tube is moved into position so as to receive the ballot-tube, the lug on the end of the lever engages the tappet-arm and rings the alarm, and at the same time the other end of the lever pushes the latch-bar with the pawl attached one ratchet back, where the pawl falls behind a ratchet, so that when the lever is returned by the force of the springs the primary registering-wheel is moved one number. This manipulation and operation successively takes place until the primary wheel is turned one revolution, when the end of the plunger-bar is engaged by the cam-lug on the fixed shaft and pushed into the recess of the adjacent registering-wheel and turned, registering such movement as indicative of ten ballots having been deposited. Ten movements of the second registering-wheel produced by the recurrence of the movements of the primary wheel bring the spring-plunger carried by the second wheel into engagement with the cam-lug and push the plunger into the recess on the side face of the next registering-wheel and turn that one numeral, indicating that one hundred ballots have been deposited.

The mechanism illustrated shows registering mechanism to indicate nine hundred and ninety-nine ballots without duplication; but another wheel being added the number would be correspondingly increased.

Having thus described my invention in such exact terms as to enable any person skilled in the art to which it appertains to make, construct, and use the same and explained the principle thereof and the preferred mode in which I contemplate applying that principle, so as to distinguish it from other inventions, I proceed to particularly point out and distinctly claim the parts, improvements, and combinations which I claim as my invention, as follows:

1. The combination of the depository-case having a door hinged to its rear end, the metal case hinged to the top of the depository-case and having a ballot-aperture in its top and arranged to rest with its bottom rear edge on the top edge of the door, and locking means to secure the door and the metal case together, substantially as specified.

2. The combination, in a ballot-box, of a bottom depository-casing provided with a door at its rear and a ballot-aperture in its top, and a metal box or case on the top of the depository-case hinged thereto and provided with a ballot-aperture to pass the ballot through and adapted to cover the ballot-aperture in the depository, and locking means to hold the cases together, substantially as described.

3. In a ballot-box, the combination, with a two-part box hinged together and arranged to be locked at their free meeting edges, and the top box having an aperture to receive a ballot, of a spring-actuated lever fulcrumed in the top box, formed with a tongue to close the ballot-aperture and an aperture in the tongue, and a finger-piece on the exterior of the box fast to the lever, whereby the lever may be moved and the aperture in the tongue brought in alignment with the ballot-aperture in the top box, as specified.

4. In a ballot-box, the combination of a metal case mounted on a ballot-depository case and adapted to close down on the top thereof and having a ballot-aperture, a lever fulcrumed on the under side of the metal case and formed with a tongue and aperture to close and open the ballot-aperture, a spring to hold and return the lever in normal position, and a finger-piece on the exterior of the metal case connected to the lever, substantially as described.

5. In a ballot-box, the combination of a case mounted and secured on a ballot-depository case and having a ballot-aperture therein, a vertical shaft journaled and supported in the case with its end projected through the top of the case and provided with a finger-piece, a lever rigidly fixed on the said shaft and provided with a tongue and ballot-tube to close and open the ballot-aperture, a bracket arranged to close the lower end of the tube when moved to align with the ballot-aperture, and a spring to return the lever with tongue and tube to normal position, substantially as described, and for the purpose specified.

6. In a ballot-box, the combination, with a case provided with a ballot-aperture, of a spring-actuated lever on the case, formed with a tongue having an aperture and a tube extending from the aperture, and means for moving the lever with the tongue and tube to and from the ballot-aperture, substantially as described.

7. In a ballot-box, the combination of a case having a ballot-aperture and provided with a lever having a tube and tongue to move to and from the ballot-aperture, a pawl connected to one end of the lever, and a registering-wheel formed with a ratchet to be engaged by the pawl, substantially as described.

8. In a ballot-box, the combination of the primary registering-wheel D, having numerals on its face-rim, a ratchet on its side, and a wave-wheel on the side of the ratchet, and a spring-actuated arm provided with a roller at its free end to engage the wave-wheel, a pawl to engage the ratchets, and a lever to shift the pawl, substantially as described.

9. In a ballot-box, the combination of a fixed shaft provided with cam-lugs, a primary registering-wheel mounted to turn on said shaft and formed with ratchets, a second registering-wheel mounted loosely on said shaft and formed with recesses in its side face, a spring-plunger in a transversely-arranged way in the primary registering-wheel to engage the cam-lug on the shaft and engage with its other end the recesses in the side face of the second registering-wheel, a third registering-wheel mounted loosely on said shaft and formed with recesses in its side faces, a spring-plunger transversely projected through the second registering-wheel to engage a cam-lug of the fixed shaft and recesses of the third registering-wheel, and means, substantially as described, for moving the primary registering-wheel, as specified.

10. In a ballot-box, the combination of a fixed shaft provided with cam-lugs, a primary registering-wheel mounted to turn on the fixed shaft and formed with ratchets, a second registering-wheel loosely mounted on said shaft and formed with recesses in its side face, a spring-plunger in a transversely-arranged way in the primary registering-wheel to engage the cam-lug on the shaft and the recesses in the side face of the second registering-wheel, a third registering-wheel mounted loosely on said shaft and formed with recesses in its side face, a spring-plunger transversely projected through the second registering-wheel to engage a cam-lug on the fixed shaft and the recesses in the side face of the third registering-wheel, wave-wheels on the sides of the respective registering-wheels, spring-actuated levers having rollers to engage the recesses of the wave-wheels, and a lever-and-pawl mechanism to turn the primary registering-wheel, substantially as described.

11. In a ballot-box, the combination, with a metal case having a ballot-aperture, of a lever fulcrumed in the case and having a tube and a tongue to slide over the ballot-aperture, an alarm mounted in the case, a tappet to strike the alarm, and a spring-arm on the tappet to engage the end of the lever, whereby when the tongue is moved from the ballot-aperture the alarm is struck, substantially as described.

In witness whereof I have hereunto set my hand in the presence of two attesting witnesses.

WILLIAM F. GAUL.

Attest:
A. G. HEYLMUN,
WM. MUSSER.